United States Patent [19]
Acar

[11] 4,165,762
[45] Aug. 28, 1979

[54] LATCHING VALVE

[75] Inventor: Ali Acar, Los Angeles, Calif.

[73] Assignee: International Telephone and Telegraph Corporation, New York, N.Y.

[21] Appl. No.: 879,062

[22] Filed: Feb. 21, 1978

[51] Int. Cl.² ............... F15B 13/044; F16K 31/06
[52] U.S. Cl. ........................ 137/625.5; 137/625.65; 251/75; 251/77; 251/137
[58] Field of Search ............ 137/625.5, 625.65; 251/75, 137, 77

[56] References Cited

U.S. PATENT DOCUMENTS

| | | | |
|---|---|---|---|
| 1,523,759 | 1/1925 | Dougherty | 251/137 |
| 2,457,739 | 12/1948 | Sherrill | 251/137 X |
| 2,521,891 | 9/1950 | Beams | 251/75 |
| 3,332,045 | 7/1967 | Rodaway | 251/137 X |
| 3,529,806 | 9/1970 | Kozel | 251/139 |
| 3,977,436 | 8/1976 | Larner | 137/625.65 |

*Primary Examiner*—Gerald A. Michalsky
*Attorney, Agent, or Firm*—A. Donald Stolzy

[57] ABSTRACT

A valve is operated between open and closed positions by respective solenoids. The valve is latched in each of the open and closed positions by a snap disc mounted in a position fixed relative to the plunger, and a pair of shoulders fixed relative to the valve body.

4 Claims, 8 Drawing Figures

LATCHING VALVE

BACKGROUND OF THE INVENTION

This invention relates to valves and, more particularly, to a valve which may be latched in either one or both of its open and closed positions.

PRIOR ART STATEMENT

In the prior art, at least two types of latching valves have been employed. A first type has utilized magnetic latches for a plunger. A second type has utilized spring biased detents. Both prior art types have been employed to latch a valve in each of two positions.

SUMMARY OF THE INVENTION

In accordance with the present invention, the above-described and other disadvantages of the prior art are overcome by providing a latching valve comprising: a body; first and second solenoids fixed in said body approximately on the same axis, but spaced axially from each other; first and second magnetic circuits fixed relative to said body and surrounding said first and second solenoids, respectively, said first and second magnetic circuits having respective first and second internal annular slots approximately concentric with said axis, but spaced apart, said slots providing air gaps; a plunger slidable through said first and second magnetic circuits; a valve; a stem connecting said valve to said plunger; a first valve seat fixed relative to said body, said first valve seat having a port therethrough, said valve being movable toward and away from said first valve seat to close and to open said port when said first and second solenoids are selectively energized, respectively; a snap disc mounted between said stem and said body, said snap disc being constructed to snap to first and second stable positions when said first and second solenoids are energized, respectively, said snap disc holding said valve closed and open when said first and second solenoids are selectively energized, respectively, and both solenoids are subsequently deenergized.

BRIEF DESCRIPTION OF THE DRAWINGS

In the accompanying drawings which illustrate exemplary embodiments of the present inventions.

DESCRIPTION OF THE PREFERRED EMBODIMENT

Figure 1:
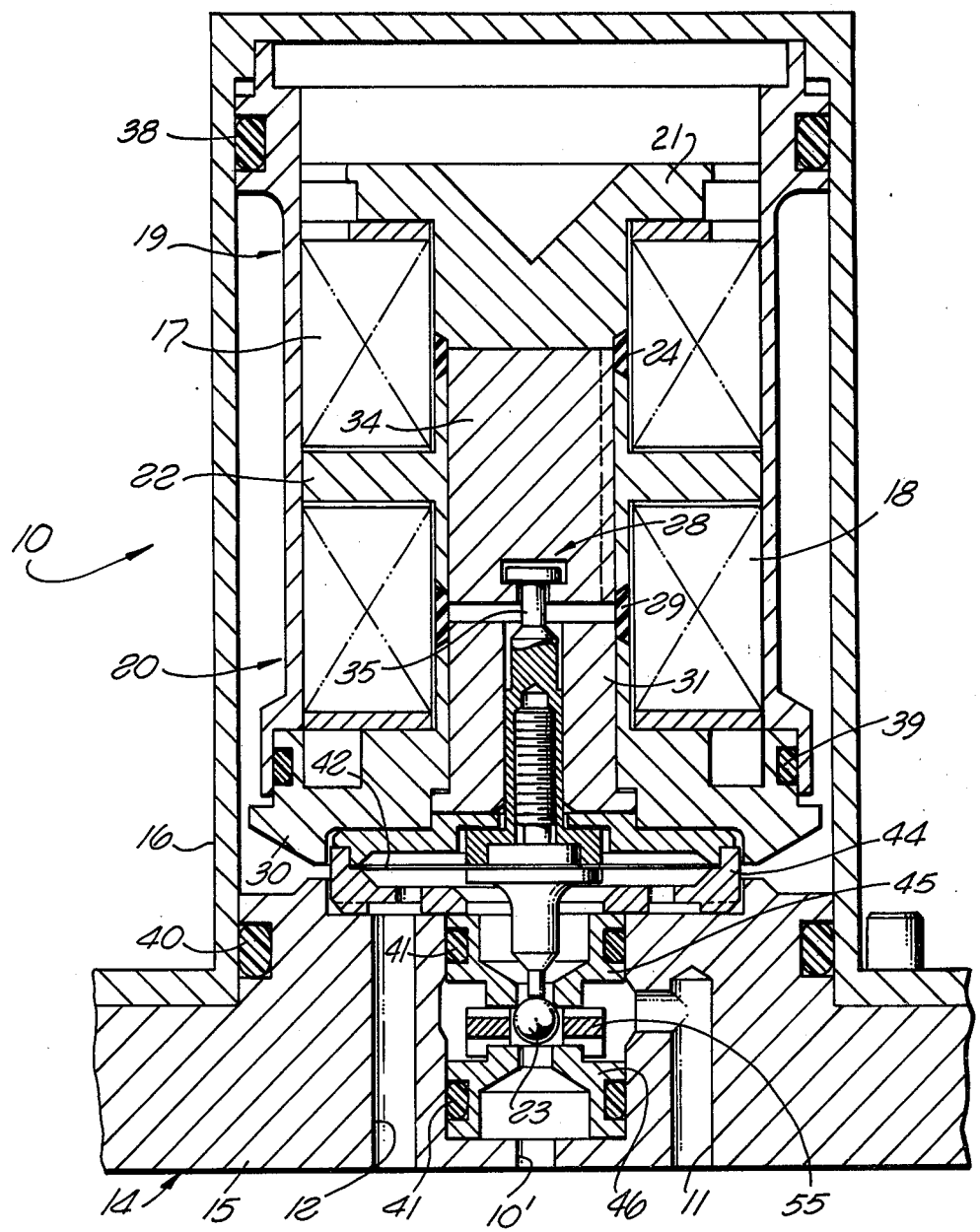
FIG. 1 is a vertical sectional view through a valve constructed in accordance with the present invention.

In FIG. 1, one embodiment of the present invention is shown including a three way valve 10 having a body 14 and inlet, cylinder and exhaust ports 10', 11 and 12, respectively. However, the porting may be changed, if desired.

Body 14 contains a lowermost casting 15 fixed to a cap 16.

Solenoids are provided at 17 and 18. Cap 16 is an aluminum housing which serves as a barrier for the flow at return side to cool the solenoids.

Solenoid 17 has a pole piece 21 and an annular member 22 fixed relative to cap 16. An air gap is provided at 24 that is filled with a nonmagnetic material. The same is true of an air gap 29.

Annular member 22 is likewise fixed relative to cap 16 as is the balance of circuits 19 and 20 including member 30 and a ferrule 31.

A stem 35 is provided having a ball valve 23 fixed thereto, and having a lost motion connection 28 with plunger 34. O-rings are provided at 38, 39, 40 and 41 to act as seals. A snap disc is provided at 42 which assumes the position shown in FIG. 1 or concave upward or assumes the position shown in FIG. 7. Another ferrule is provided at 43 which is fixed relative to the valve body. Plunger 34 is slidable in the body, and stem 35 is slidable in ferrule 31.

Figure 5:
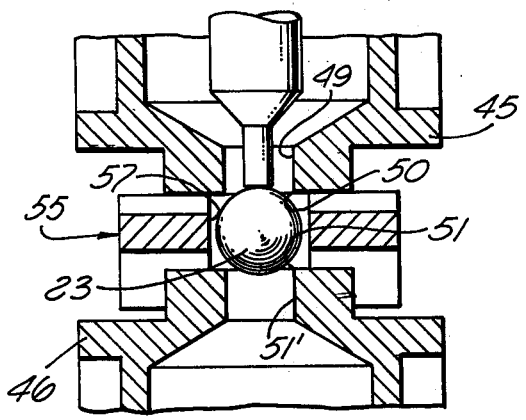
FIG. 5 is a broken-away vertical sectional view of the apparatus in a valve opening position.
Figure 6:
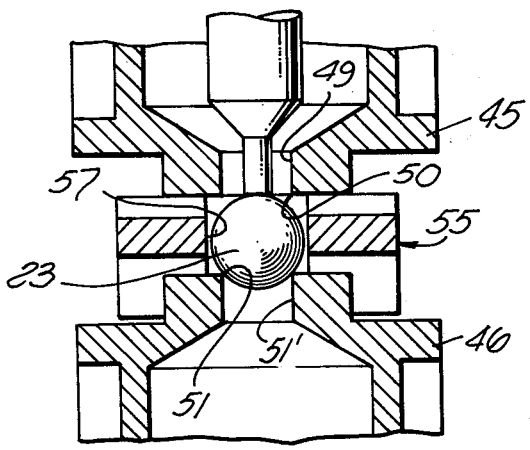
FIG. 6 is a broken-away vertical sectional view of the valve in another closing position.

Still another ferrule 44 is also fixed relative to the valve body. The same is true of another ferrule 45 and another ferrule 46. Valve 23 is small and spherical. It can be fixed to or be integral with stem 35. Valve 23 closes or opens port 49 in ferrule 45, port 49 extending through a valve seat 50 on which valve 23 rests in the closed position. See FIG. 4. Ferrule 46 also has a valve seat 51 which may be closed by valve 23 as shown in FIG. 6 and in FIG. 7. In moving from one position to another, valve 23 may appear as indicated in FIG. 5. Valve seat 51 has a port 51' therethrough.

Snap disc 42 is circular, is fixed to stem 35 at its center, and is fixed to the valve body at its circular periphery.

Snap disc 42 and its mountings, by themselves, are entirely conventional. If desired, in either or both of the positions of snap disc 42 shown in FIGS. 1 and 7, the same may or may not be snugly fitted so as to provide either an upward force or a downward force on plunger 34 to hold valve 23 tightly in engagement with seat 50 shown in FIG. 4 or tightly against seat 51 as shown in FIG. 6.

Figure 2:
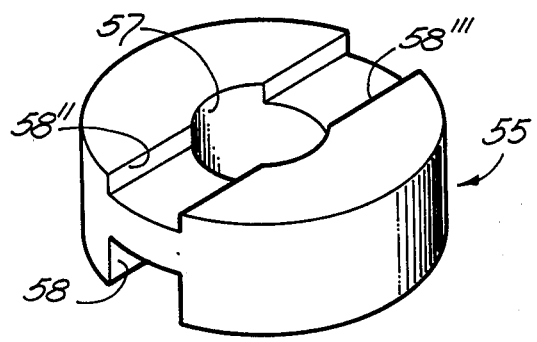
FIG. 2 is a perspective view of a plate shown in FIG. 1.
Figure 3:
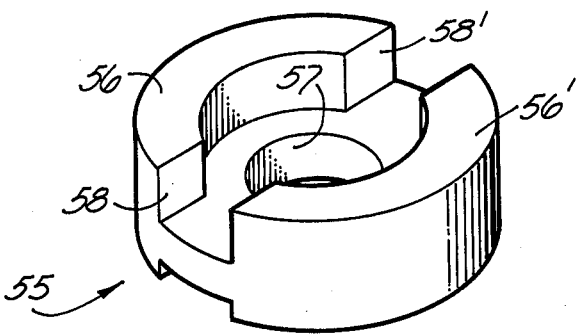
FIG. 3 is another perspective view of the plate shown in FIG. 2.

A plate 55 separates ferrules 45 and 46. Plate 55 is shown in FIGS. 2 and 3 including, in FIG. 3, axially extending flanges 56 and 56', a hole 57 therethrough, and notches 58 and 58' in the top thereof. As shown in FIG. 2, the recess has portions 58' and 58". Channels 58" and 58"' are provided on opposite sides of hole 57. Notches 58 and 58' and channels 58" and 58"' provide communication with port 11 from port 10 or port 12, depending upon the position of valve 23.

Figure 8:
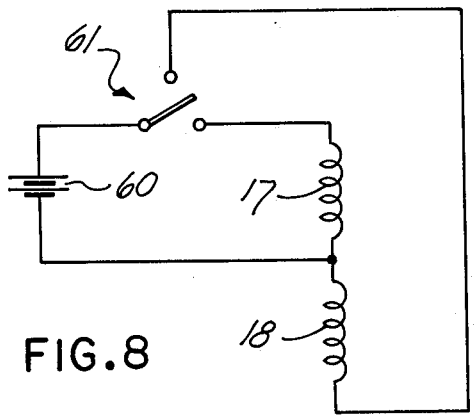
FIG. 8 is a schematic diagram of a circuit employed with the embodiment of the invention illustrated in FIG. 1.

In FIG. 8, a source of potential 60 supplies power to the solenoids 17 and 18 through a single pole, double throw switch 61. Note will be taken from FIG. 8 that only one of the solenoids 17 and 18 is energized at one time.

Operation

Figure 4:
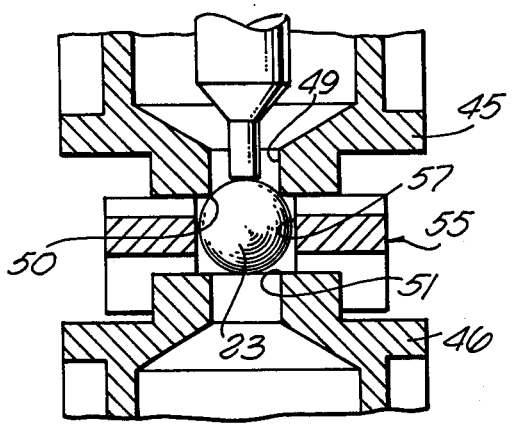
FIG. 4 is a broken-away vertical sectional view of apparatus in one valve closing position.
Figure 7:
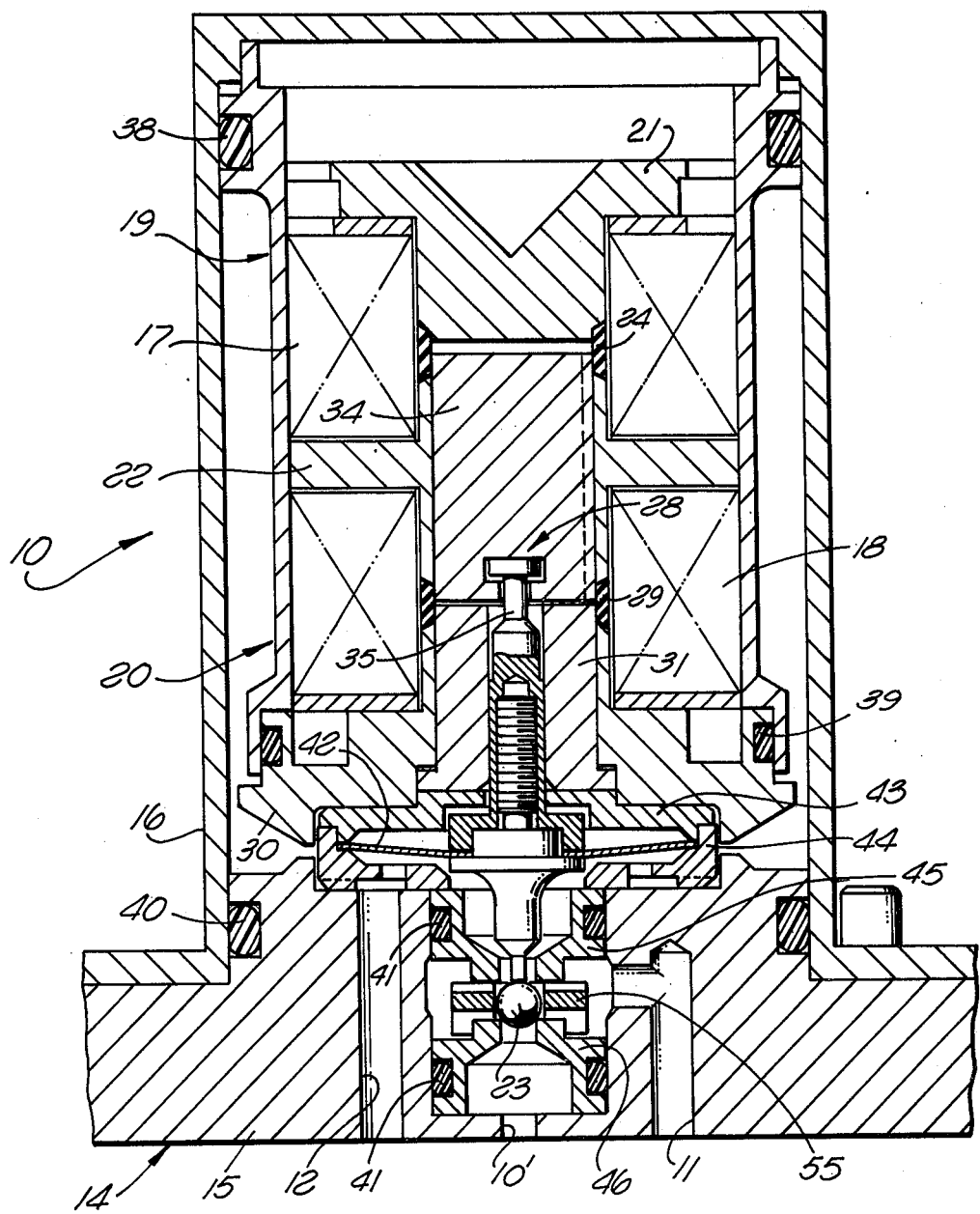
FIG. 7 is a vertical sectional view through the valve similar to the one shown in FIG. 1 with the apparatus shown in the said other valve closing position, the said one valve closing position being shown in FIG. 1.

In the operation of the embodiment of FIG. 1, to cause the valve 23 to close the port 49 by engaging seat 50 in FIG. 4, solenoid 17 is energized, and plunger 34 rises from the position shown in FIG. 7 to the position shown in FIG. 1 in abutment with pole piece 21. This is true because magnetic flux billows out from the effective air gaps at 24 and 29, the magnetic circuit 19 thus being completed by the movement of plunger 34 to the position shown in FIG. 1.

On the other hand, if it is desired to move plunger 34 from the position shown in FIG. 1 to the position shown in FIG. 7, plunger 34 is drawn downwardly as a result of the magnetic field created adjacent air gap 29.

What is claimed is:

1. A latching valve comprising: a body; first and second solenoids fixed in said body approximately on the same axis, but spaced axially from each other; first and second magnetic circuits fixed relative to said body and surrounding said first and second solenoids, respectively, said first and second magnetic circuits having respective first and second internal annular slots approximately concentric with said axis, but spaced apart, said slots providing air gaps; an armature slidable through said first and second magnetic circuits; a valve; a stem connecting said valve to said armature; a first valve seat fixed relative to said body, said first valve seat having a port therethrough, said valve being movable toward and away from said first valve seat to close and to open said port when said first and second solenoids are selectively energized, respectively; a snap disc mounted between said stem and said body, said snap disc being constructed to snap to first and second stable positions when said first and second solenoids are energized, respectively, said snap disc holding said valve closed and open when said first and second solenoids are selectively energized, respectively, and both solenoids are subsequently deenergized, said armature and said stem having a lost motion connection therebetween.

2. The invention as defined in claim 1, wherein said snap disc is stressed in a stable position when both of said solenoids are deenergized to force said valve against said first valve seat.

3. The invention as defined in claim 2, wherein said snap disc is stressed in another stable position when both of said solenoids are deenergized to force said valve open.

4. The invention as defined in claim 1, wherein said body has a second valve seat therein, said first and second valve seats being spaced on opposite sides of said valve a distance greater than the thickness of said valve, said snap disc, when both of said solenoids are deenergized, being bistable to hold said valve in sealing engagement with one and the other of said valve seats when said snap disc is in one and the other of its two stable positions, respectively, said snap disc being movable from one to the other stable position thereof by selective energization of said solenoids.

* * * * *